(12) United States Patent
Harrison et al.

(10) Patent No.: US 9,170,425 B1
(45) Date of Patent: Oct. 27, 2015

(54) MULTI-FOCAL AUGMENTED REALITY LENSES

(71) Applicant: Lockheed Martin Corporation, Bethesda, MD (US)

(72) Inventors: Gregory A. Harrison, Oviedo, FL (US); Davd A. Smith, Cary, NC (US)

(73) Assignee: Lockheed Martin Corporation, Bethesda, MD (US)

( * ) Notice: Subject to any disclaimer, the term of this patent is extended or adjusted under 35 U.S.C. 154(b) by 130 days.

(21) Appl. No.: 13/874,064

(22) Filed: Apr. 30, 2013

Related U.S. Application Data (63) Continuation-in-part of application No. 13/211,372, filed on Aug. 17, 2011, now Pat. No. 8,625,200, and a continuation-in-part of application No. 13/211,389, filed on Aug. 17, 2011, now Pat. No. 8,781,794.

(60) Provisional application No. 61/640,039, filed on Apr. 30, 2012.

(51) Int. Cl.
| | |
|---|---|
| *G02B 27/14* | (2006.01) |
| *G09G 5/00* | (2006.01) |
| *G02B 27/10* | (2006.01) |
| *G02B 27/01* | (2006.01) |

(52) U.S. Cl.
CPC ........ *G02B 27/1066* (2013.01); *G02B 27/0172* (2013.01)

(58) Field of Classification Search
CPC ........ G02C 7/024; G02C 7/061; G02C 7/063; G02C 7/08; G02C 7/083; G02C 7/101; G02C 7/02; G02C 7/06; G02C 7/068; G02C 1/133553; G02C 1/134309; G02B 2027/0178; G02B 27/017; G02B 27/0172; G02B 2027/011; G06F 1/163
USPC .................................. 359/629–634; 345/7–9
See application file for complete search history.

(56) References Cited

U.S. PATENT DOCUMENTS

| | | | | |
|---|---|---|---|---|
| 6,089,713 | A * | 7/2000 | Hof et al. | 351/159.47 |
| 6,577,411 | B1 * | 6/2003 | David | 359/19 |
| 8,042,942 | B2 * | 10/2011 | Kaga et al. | 351/159.42 |
| 8,488,246 | B2 * | 7/2013 | Border et al. | 359/630 |

OTHER PUBLICATIONS

Sheng Liu, et al., "Time-multiplexed dual-focal plane head-mounted display with a liquid lens" Optics Letters, vol. 34, Issue 11, pp. 1642-1644, 2009.

(Continued)

*Primary Examiner* — Alicia M Harrington
(74) *Attorney, Agent, or Firm* — Jetter & Associates, P.A.

(57) ABSTRACT

A lens includes a reflective inside surface including a first inside surface portion having an optical surface which focuses an incident beam of a first image so that objects in the first image appears at a first virtual distance, and at least a second inside surface portion having an optical surface which focuses an incident beam of a second image so that objects in the second image to appear at a second virtual distance that is further than the first virtual distance. The lens is a passive lens. The lens can be used in an optical see-through head mounted display (HMD) apparatus to allow a user of the HMD to focus on nearby virtual objects coming from the first inside surface portion while viewing nearby external-world objects and to focus on more distant virtual objects coming from the second inside surface portion while viewing more distant external-world objects.

19 Claims, 6 Drawing Sheets

(56) References Cited

OTHER PUBLICATIONS

Jannick P. Rolland, et al., "Multifocal planes head-mounted displays", Applied Optics, vol. 39, No. 19, Jul. 1, 2000, pp. 3209-3215.

Robert E. Fischer, et al., Methods for Improving Depth Perception in HMDs, RTO HFM Workshop on "The Capability of Virtual Reality to Meet Military Requirements", held in Orlando, FL, Dec. 5-9, 1997.

* cited by examiner

MULTI-FOCAL AUGMENTED REALITY LENSES

CROSS REFERENCE TO RELATED APPLICATIONS

This application claims the benefit of Provisional Application Ser. No. 61/640,039 entitled "MULTI-FOCAL AUGMENTED REALITY LENSES", filed Apr. 30, 2012, which is herein incorporated by reference in its entirety. This application is also a continuation-in-part (CIP) of a first related patent application Ser. No. 13/211,389 entitled "Methods and Systems for Creating Free Space Reflective Optical Surfaces" and a second related patent application Ser. No. 13/211,372 entitled "Head-Mounted Display Apparatus Employing One or More Reflective Optical Surfaces", which are both incorporated herein by reference in their entirety.

FIELD

Disclosed embodiments relate to multi-focal lenses including bifocal and progressive lenses, and apparatus including disclosed lenses including optical-see-through augmented reality head mounted displays therefrom.

BACKGROUND

For virtual reality and augmented reality (AR) applications, such as head mounted display (HMD) applications, the optical position of the computer-generated (virtual) objects is generally fixed at one particular distance, such as for either near-viewing or for distance viewing. In the case where the optical position is set for distance viewing and close-in work (viewing) needs to be accomplished by the user of the HMD, the eye of the user has to refocus continually between the distant virtual object and the close-in physical object. Simply adjusting the convergence of the eyes optically to reflect a three-dimensional (3D) position is insufficient to compensate for the overlay of virtual objects with physical objects that occurs in optical see-through AR glasses.

SUMMARY

Disclosed embodiments include lenses including a reflective inside surface having a first inside surface portion having an optical surface which focuses an incident beam of a first image so that objects in the first image appear at a first virtual distance. The reflective inside surface also includes at least a second inside surface portion having an optical surface which focuses an incident beam of a second image so that objects in the second image appear at a second virtual distance that is further than the first virtual distance. For example, for a 3 inch×3 inch lens the top two inches of the lens from side to side may be provided with optics for virtual images appearing at the second virtual distance for distance viewing of virtual images, and the bottom inch of the lens from side to side may be provided with optics for virtual images appearing at a first virtual distance set for near viewing of virtual images. In between the first inside surface portion and second inside surface portion there can be a transition region which has an optical surface which focuses an incident beam so that objects in the image appear at a third virtual distance (or a range of third virtual distances) which is between the second virtual distance and the first virtual distance.

As used herein, the second virtual distance appearing in the second inside surface portion being further than the first virtual distance appearing in the first inside surface portion refers to the value of the second virtual distance being at least twenty 20 (%) greater than the value of the first virtual distance, and generally being different by at least a factor of 2. Moreover, although disclosed optical design algorithms target the virtual distances within the first and second inside surface portions to each be stable and all one particular value, in case of a range of virtual distance values in these inside surface portions the virtual distances are averaged for calculating differences in virtual distances between the respective surface portions, which depending on the fabrication method will typically be in a range of ±5% from the average virtual distance with the areas of the respective inside surface portions.

Disclosed lenses are passive lenses, which may be contrasted with active lenses such as a liquid filled lens (which use liquid pumps) or a liquid crystal lens (which use electric fields). The lens can be used in apparatus including an optical see-through head mounted display (HMD) apparatus to allow an eye of a user of the HMD to focus on nearby virtual objects coming from the first inside surface portion while viewing nearby external-world objects and to focus on more distant virtual objects coming from the second inside surface portion while viewing more distant external-world objects.

Disclosed lenses can be configured to only affect the virtual objects in the scene, and not affect the real world viewing by not changing the real world optics. As a result, as applied to optical see-through AR applications such as enabled by a curved beam splitter, virtual images incident on different portions of the reflective inside surface of the beam splitter provide different optics in order to make the respective virtual images appear to be in the real world image at the intended distance.

In one embodiment, the curved beam splitter can reflect virtual objects such that in the upper part of AR head mounted display (HMD) glasses they appear further away, while progressively appearing to become closer in the lower part of the AR HMD glasses. As described below, this can be implemented by modifying the lens parameters within the reflective inside surface of the lens to provide different lens (converging) power across the area of each of the inside surface portions to provide the desired virtual distances for viewing objects in the virtual image.

The (focal length or lens power) variation across disclosed reflective inside surfaces can be described using "oxels", which are each small optical systems that express 3 dimensional (3D) curvature at relatively small area surface locations, where a large number of oxels (e.g., thousands) are part of a larger optical system (e.g., the reflective lens). Each oxels is typically on the order of 50 μm to 1 mm in each in-plane direction, such as in one particular embodiment there are 500 oxels across a 4 inch lens surface, for 0.2 mm×0.2 mm oxels, that express 3D surface curvature at surface locations. The oxels (by way of non-limiting example, thousands) define the optical system upon data smoothing and fabrication become reflective optical elements that collectively provide a disclosed reflective surface.

Each oxel can be treated on an internal surface-by-surface basis to determine their own respective lens power. The plurality of oxels include a plurality of different curvatures to provide a focus power which varies across the free space 3D reflective lens.

"Free space lenses" or "free space reflective optical surfaces" as used herein refers to lenses or reflective 3D surfaces which are designed by the oxel method. Free space lenses and reflective optical surfaces are not created by polynomials expressing the z-axis height referenced to an x-y plane as is done in free-form lenses. Instead, the reflective optical elements can be created in any location in 3D space, in any direction, and can even wrap around past 180 degrees, which would be difficult to represent as a height above an x-y plane. Each of the reflective optical elements forms a single optical system, and these optical systems are smoothed over the whole intended reflective optical surface after being adjusted to obtain to a low overall error for the free space optical surface.

In the oxel method, the plurality of oxels on the reflective optical surface are expressible as a point cloud, where the point cloud is convertible using a suitable fabrication method into a tangible disclosed multi-focal reflective optical surface. A point cloud is a set of vertices in a three-dimensional coordinate system, defined by 3 coordinates, such as x, y, and z coordinates, which represent of the external surface of an object.

The phrase "reflective optical surface" includes surfaces that are only reflective, as well as surfaces that are both reflective and transmissive in the case of a beam-splitter for an optical see-through HMD. In either case, the reflectivity can be only partial, i.e., part of the incident light can be transmitted through the surface. Likewise, when the surface is both reflective and transmissive, the reflectivity and/or the transmissivity can be partial.

BRIEF DESCRIPTION OF THE DRAWINGS

Reference will now be made to the accompanying drawings, which are not necessarily drawn to scale, wherein.

DETAILED DESCRIPTION

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

An optical-see-through AR HMD may be focused to have the virtual objects optically focus at a certain distance but the outside-real world objects will all focus at their actual location in the external world. Disclosed embodiments include lenses having reflective inside surfaces as curved beam splitters to provide an eye of the user of an optical-see-through AR HMD the ability to focus on both near and far objects in the external (real) environment, while still seeing focused virtual objects in the internal virtual/augmented environment.

In optical-see-through AR, the user can see actual external-world (real world) objects at different physical locations that thus have different optical properties. For example, if a virtual object is projected to appear to the eye of the user at a relatively long distance, for instance 50 m away in the optically-see-through AR HMD, virtual object(s) from a pixel display screen reflected by the lens will appear out of focus when the user is looking at nearby external-world objects, such as external-world objects at 50 cm (0.5 m) away. Similar to what is done to adjust the focus of external-world light entering the user's eyes from distant or near locations, virtual reality objects can be made to appear at different optical distances by the appropriate intervening optics.

Disclosed embodiments do not need to correct the light waves reaching the user's eyes from the external-world. If the light rays come from far away, the eye of the user will still generally focus far away to the light rays coming from far away, and conversely if the light rays come from nearby real objects the eye of the user will focus on the nearby objects to see them clearly. This is conventionally facilitated for real-world objects by using reading glasses to help the user to focus on nearby things more easily, or corrective glasses that help the user focus on things further away.

Instead, disclosed embodiments correct the optical qualities of a reflective inside surface of a lens in the optical-see-through AR HMD so that a first portion of the pixel display screen together with the first inside surface portion of the lens will allow the eye of the user to focus on virtual objects appearing nearby (having a smaller virtual image distance (or focus distance/depth, such as 2 m), and second portion of the display together with the second inside surface portion of the lens which allows the eye of the user to focus on virtual objects, appearing further away (having a larger virtual image distance (or focus distance/depth, such as 40 m).

As disclosed herein, the reflective surface of disclosed lenses can be implemented by a design that divides the lens area into a plurality of oxels, which each can provide a different localized optical surface, being at least 2 in each in-plane direction, and generally being at least 100 oxels in each in-plane direction. In one embodiment, the virtual image distance can gradually change in a transition region between two virtual image distances. Thus, the optical-see-through AR HMD user can wear the same glasses while outside and looking at distant objects and while working in close proximity to nearby objects or items, such as objects/items on a desk. As disclosed herein, in some embodiments the virtual objects that appear in the AR HMD view in the first portion of the HMD that is focused at a first virtual distance will be in focus to the eye of the user as the user is focusing on nearby external-world objects, and the virtual reality objects that appear in the AR HMD view in the section of the HMD that is focused at a second virtual distance further than the first virtual distance will be in focus to the eye of the user as the user is focusing on more distant external-world objects.

As an example of a problem solved by disclosed embodiments, if the AR HMD is displaying a virtual image of a television screen appearing 10 meters away from the user, the user will see a television screen focused at 10 meters away in whatever direction the user turns their head. If, while this AR image is active in the user's HMD, the user performs some close-up task in the outside-world, such as at 50 cm (0.5 m) away from their eyes, their eyes will focus at 50 cm and the AR television screen will be blurry.

In the case of the virtual television 10 meters away, the accommodation of the lenses in the user's eyes will relax to allow a diopter 1/10 [D] image to focus on the user's fovea of the retina which is the small region of highest visual acuity. Diopter refers to the vergence of light at a point, which can be converging or diverging (by convention a negative diopter is divergent). Real objects in the environment generally all produce divergent light except for lenses and converging mirrors that can converge light, but otherwise the light waves leaving each point on a surface all diverge.

Figure 3:
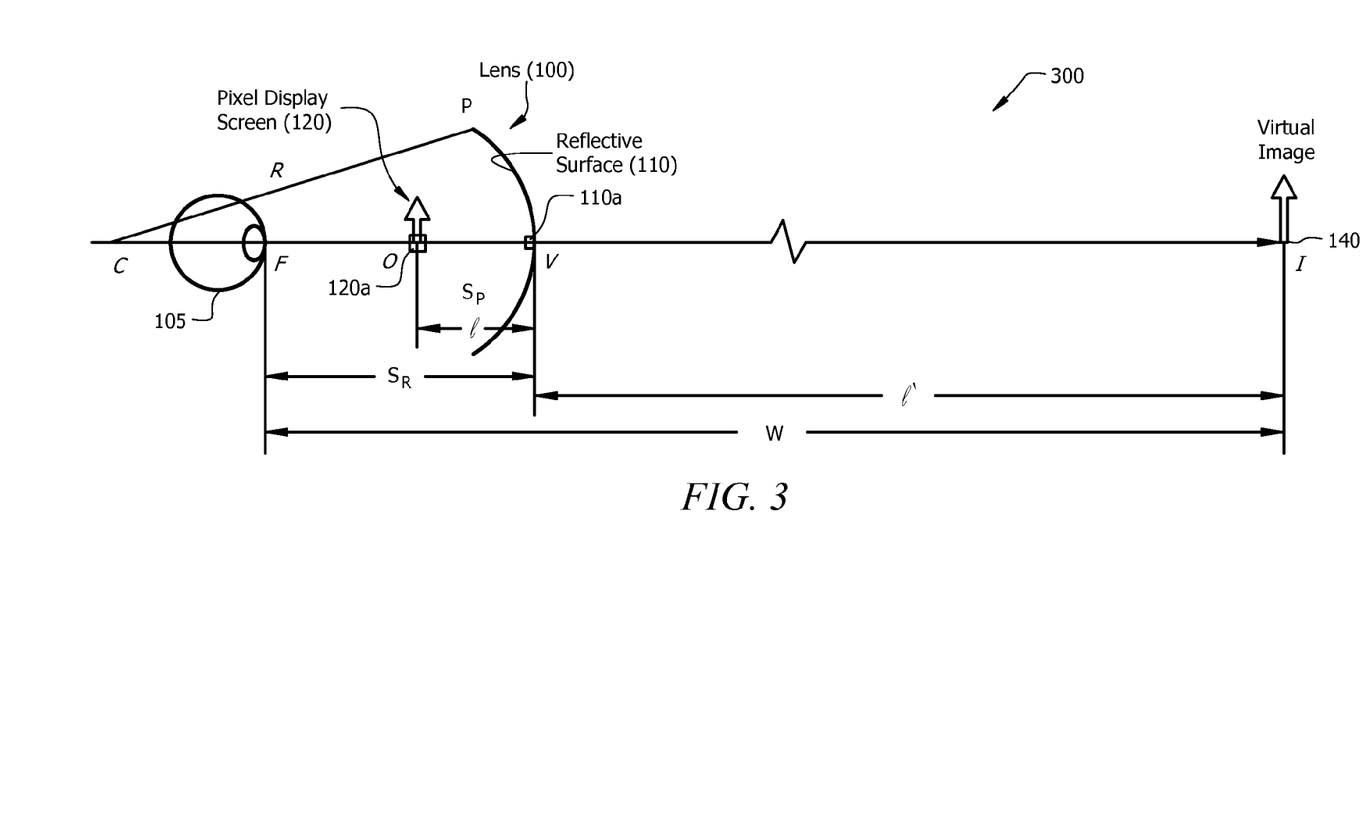
FIG. 3 shows an optical system for analysis of system parameters and automated adaptation, according to an example embodiment.

The vergence is conventionally measured in diopters, having a unit [D], where the diopter is 1/(distance to the object in meters). Thus an object 10 m away from the eye has a vergence of +0.1 D when it reaches the eye, but an object at 50 cm away has a vergence of 2.0 D, and the eye of the user has to accommodate differently (refocusing of the eyes to a distance of the object being viewed) to see the items at the two different distances. In an AR system, the eye of the user will adapt (accommodate) to look at items at different distances. FIG. 3 shows an example optical system 300 for designing disclosed reflective optical surfaces that place the virtual images of the virtual objects at a specified distance from the eye of a user. Equation 5 described below defines the amount of lens power (P) to be used for each location on the reflective optical surface as a function the distance from a respective location on the reflective inside surface to a predetermined position of an eye of a user ($S_R$), and a distance from a display pixel of a pixel display screen 120 that transmits the incident beam to the respective location (Sp) to create that effect. It is again noted that this is not an optical correction that permits the eye of the user to focus on real objects in the environment at different distances, but instead places virtual objects generated by a computer graphics system transmitted by a pixel display screen or other image or image generation system into the environment. These are called virtual images in the optical design vernacul$_a$r, and in this application, the virtual images of the virtual objects are focused to appear to the HMD user's eye at two or more different virtual distances (from the first and second inside surface portions) in external-world (real-world) space.

In a 3D television or in other 3D display systems, the illusion of having a virtual item appear at a particular distance from the user is accomplished by depending on the stereoscopic representation of the images such that each eye gets a different image allowing the angular separation of the portrayed images to indicate the distance away from the user that the object is. That type of distance representation is conventionally portrayed using an optical device having a single focus depth, so that the eye does not have to change its focus as the perceived object moves around in the portrayed scene.

In the case when the user is also working in the external-world, as in optical-see-through AR HMD where the user sees the outside world directly with superimposed virtual images, including virtual objects appearing in that world, disclosed embodiments recognize objects are distributed at different distances from the user, which accounts for nearby objects being out of focus when looking at more distant objects. Thus, to enable interaction with the real world, the optically-see-through AR HMD can benefit from different focus points for the virtual information being presented to the user, so they can comfortably work while viewing objects at the distance they need to in order to interact with the real world. As described below (see Equation 5), this can be accomplished by having the amount of lens power (P) along the area of the reflective inside surface be set by W in the portrayal of the virtual objects from a pixel display screen as generated and transmitted by a near-to-the-head pixel display screen. W controls the P, whether portraying a far away virtual object or a more nearby virtual object.

With the need to generally have the image display unit close to the eye of the user, the distance to each picture element (pixel) on the pixel display screen can change substantially from one side of the image to another location on the image. Various embodiments are included for the capabilities provided by disclosed embodiments, with a particular embodiment being that of a single reflective inside optical surface that produces lens power adjustment across its surface to reduce the vergence of nearby virtual pixels in order to allow the user to see the close-by real imagery.

Figure 1:
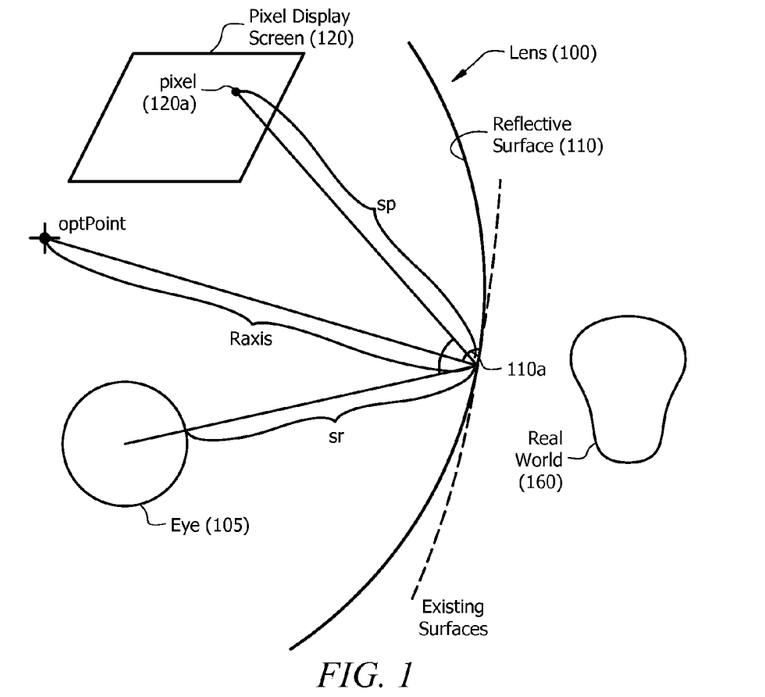
FIG. 1 depicts a region of a reflective inside surface of a disclosed lens, for reflecting a particular pixel from the pixel display shown into the eye of a user, suitable for use in a near-to-the-head optical see-through AR HMD for the user seeing virtual images of virtual objects.

Referring now to FIG. 1, a region 110a (e.g., a reflective surface element derived from an oxel of a reflective inside surface 110 of a disclosed lens 100) that is generally spherically shaped is shown reflecting a light beam from a particular pixel 120a from a pixel display screen 120 into the eye 105 of a user. An object in the real world is shown as "real world" 160. The reflective inside surface 110 can, in one embodiment, be configured using an oxel design method and then fabricated using a suitable fabrication method as described below, with the oxel design method referred to as the free-space wide field of view design method, where the reflective surface is broken into a large number (e.g., thousands) of optical reflective elements, called oxels, that each form small reflective systems for processing small sections of the whole image.

The oxel design method can disclose in accordance with an aspect, a computer-based method for designing a free space reflective optical surface for use in a HMD apparatus that reflects a virtual image of a display surface (e.g., pixel display screen) for viewing at a preselected spatial location by a user's eye. The method comprises using one or more computers to perform the step of representing, by the one or more computers, the display surface by a plurality of display objects. The method also comprises using one or more computers to perform the step of representing, by the one or more computers, the free space reflective optical surface by a plurality of reflective surface elements.

Each reflective surface element may be characterized by (i) a spatial location relative to the display surface, the location of a nominal user's eye, and the preselected spatial location of the virtual image, (ii) a normal and (iii) a radius of curvature. The method also comprises using one or more computer to perform the step of associating, by the one or more computers, each display object with at least one surface element in the direction of which a virtual image of the display object at the preselected spatial location will be displayed to the nominal user's eye, each reflective surface element being associated with a single display object. For each reflective surface element, an initial spatial location of the element is defined.

For each reflective surface element, an initial direction of the element's normal using the element's initial spatial location, the location of the display object with which the reflective surface element is associated, and the location of a center of rotation of the nominal user's eye so that light from the display object that reflects off of the element will pass through the center of rotation is calculated, by the one or more computers. For each reflective surface element, an initial radius of curvature for the element so that the virtual image of the display object is focused at the user's eye is calculated, by the one or more computers. For each reflective surface element, a final spatial location of the element, a final direction of the element's normal, and a final radius of curvature for the element and a set of surrounding elements by iteratively adjusting the spatial locations of the elements until an error function satisfies a predetermined criterion is calculated by the one or more computers.

The oxel design method may be part of a system comprising a processor and a memory unit coupled to the processor where there the memory unit stores a computer program which includes programming instructions for performing the aforementioned method. In another aspect, a computer program embodied in a tangible computer medium may be provided for performing the aforementioned method.

The oxel design method can be a computer-based method for designing a free space reflective optical surface for use in a HMD that reflects a virtual image of a display surface for viewing by a user's eye. The method comprises using one or more computers to perform the step of representing, by the one or more computers, the display surface by a plurality of display objects. The method comprises using one or more computers to perform the step of representing, by the one or more computers, the free space reflective optical surface by a plurality of reflective surface elements. The method comprises using one or more computers to perform the step of iteratively calculating, by the one or more computers, at least a spatial location and at least a normal and at least an appropriate radius of curvature for each surface element of the plurality of surface elements which will cause a virtual image of each display object to be displayed to a nominal user's eye in a desired direction of gaze of the eye for that display object.

Figure 2:
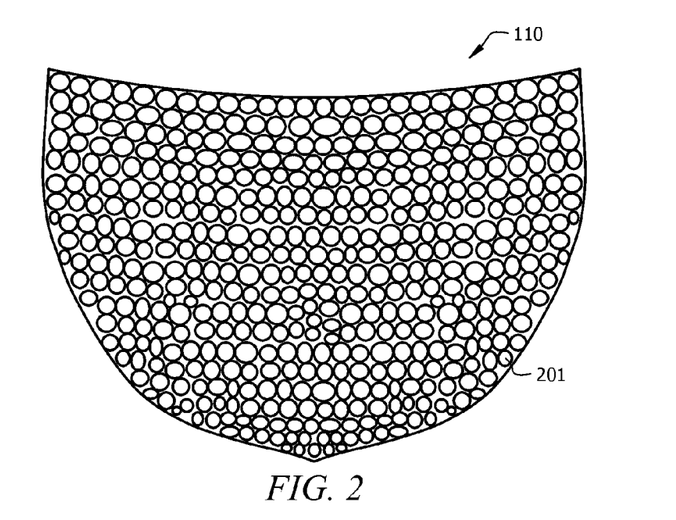
FIG. 2 shows oxels spread across an example reflective inside surface of a disclosed lens. There would generally be many more oxels than the number shown.

The oxel design concept is depicted in FIG. 2 which shows the reflective inside surface 110 comprising a plurality of oxels 201 that can each correspond to a region (e.g., reflective surface element) 110a shown in FIG. 1. The oxel shape can be other than the elliptical/circular shape shown in FIG. 2, such as in a hexagonal pattern.

The amount of lens (converging) power (P) that the reflective inside surface 110 provides is varied to provide a desired virtual image distance in each reflective surface portion (see FIG. 5 below with portions 510, 520, and 530) independent of the location along the reflective inside surface with respect to the distance to the particular pixel 120a. FIG. 3 shows a schematic of an example optical system 300 for analysis and design of system parameters and automated adaptation. In FIG. 3, the parameters shown are:
P=the diopter power [D] of the reflective inside surface 110, in the small area of region (e.g., reflective surface element) 110a shown at the vertex V of a disclosed lens 100 being a concave lens;

W=the desired distance in meters from the eye 105 to the virtual image 140;
R=the radius in meters to the reflective inside surface 110 of the region (e.g., reflective surface element) 110a from the center point C.
$S_P$=the distance to the pixel (or a small clustered group of pixels) on the display screen 120 from the vertex V of the reflective inside surface 110 (in m),
$S_R$=the distance from a reflection off the region (e.g., reflective surface element) 110a of the reflective inside surface 110 to the eye 105 [m]
s'=the distance to the virtual image 140 from the vertex V of the reflective inside surface 110. The following optics sign conventions are based on the book: "Introduction to Optics, $2^{nd}$ Ed." By F. L. Pedrotti, S. J. and L. S. Pedrotti, Prentice Hall, NJ, 1993.
Equation 1 shown below represents the optical system 300:

$$\frac{1}{s_P} + \frac{1}{s'} = -\frac{2}{R} \qquad 1$$

In this system 300, for the correct optics, the sign conventions from Pedrotti are:
1.) Because the pixel being displayed is to the left of the vertex V, then the object is real and s is positive.
2.) Because the virtual image 140 is to the right of the vertex V, the image is virtual and s' is negative.
3.) Since the reflective inside surface 110 is concave, the center of curvature C is to the left of the vertex V, and R is negative. From FIG. 3 and sign convention 2, it can be seen that $$s' = -(|W| - |s_g|) \qquad 2$$

Solving for R, and substituting in for s' yields $$R = \frac{-2}{\frac{1}{|s_P|} + \frac{1}{|s_R| - |W|}} \qquad 3$$

This solution for R also uses the absolute value of $S_P$, referencing sign convention 1.
Refactoring the solution for R yields:

$$R = \frac{2|s_P|(|s_R| - |W|)}{|W| - |s_P| - |s_R|} \qquad 4$$

The power, P, of the reflective inside surface 110 in diopters [D] is shown in Equation 5 below, where the units of meters has been indicated in the lengths $$P = \frac{1}{focalLength[m]} = -\frac{2}{R[m]}[D] = -\frac{|W| - |s_P| - |s_R|}{|s_P|(|s_R| - |W|)} \qquad 5$$

Equation 5 lets one set the virtual object focus distance independent of Sp and Sr. By changing W one can make the system adapt to provide all the virtual objects appearing in the first portion of the lens to appear at one virtual distance, while all the virtual objects appearing in a second portion of the lens to appear at a different virtual distance. These distances for these lens portions would be for close viewing, far viewing, with the option for in between viewing in the optional progressive area.

As a specific example, if the desired virtual image distance W is 50 m, the reflective inside surface 110 is 40 mm from the eye 105 ($S_R$), and the display pixel 120a of pixel display screen 120 is 40 mm from the reflective surface 110 (Sp), the lens P is found to be =24.98 [D]. If the desired virtual image distance W is 25 cm, then the lens P of the reflective surface 110=20.23 D. Disclosed embodiments thus recognize the virtual image distance W can be set by adjusting the lens P provided by reflective inside surface 110 based upon Equation 5.

Figure 4A:
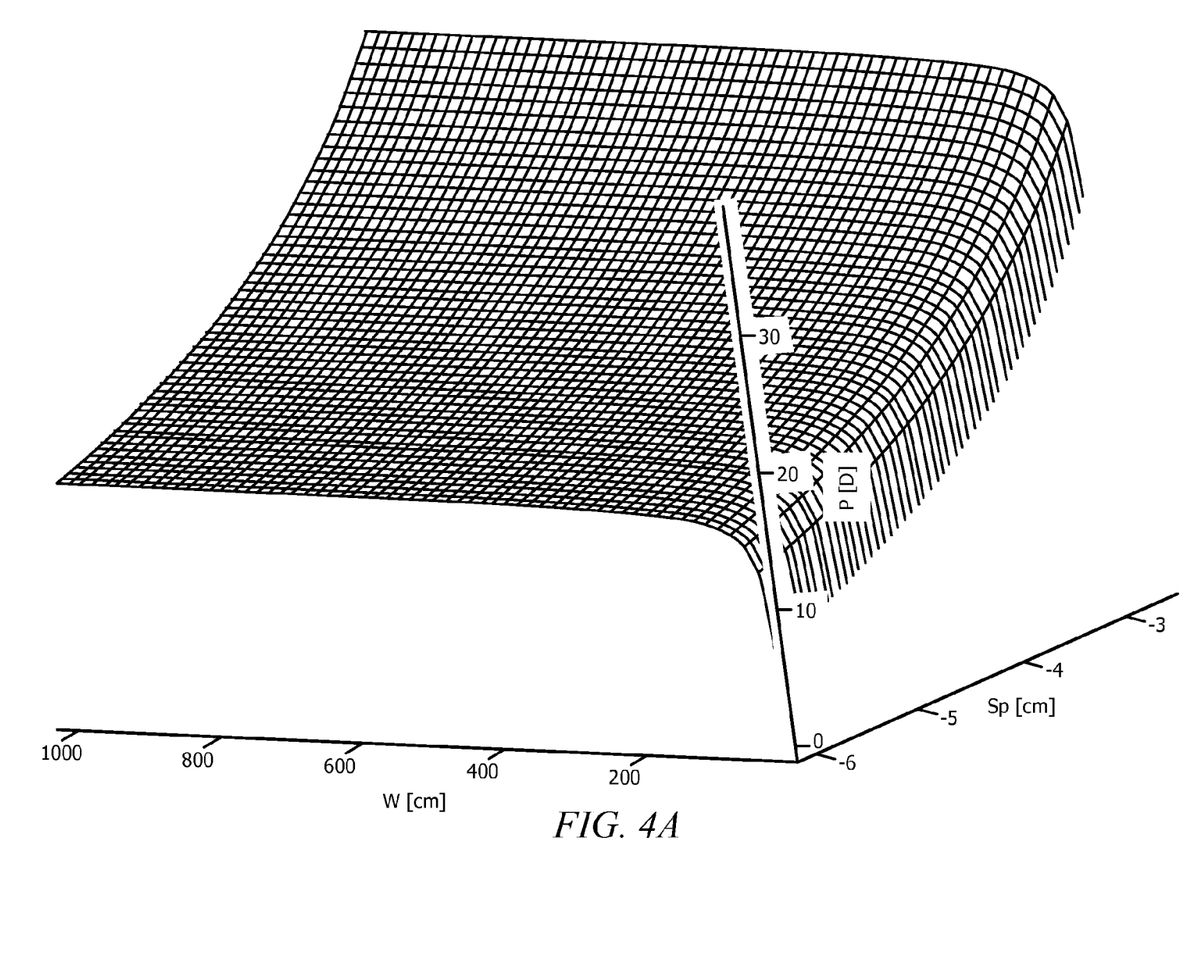
FIG. 4A is a multidimensional plot of the variation of the lens or oxel power (P) with respect to the distance (W) of the virtual image from the user and the distance of the pixel in consideration from the particular oxel or surface location being analyzed.
Figure 4B:
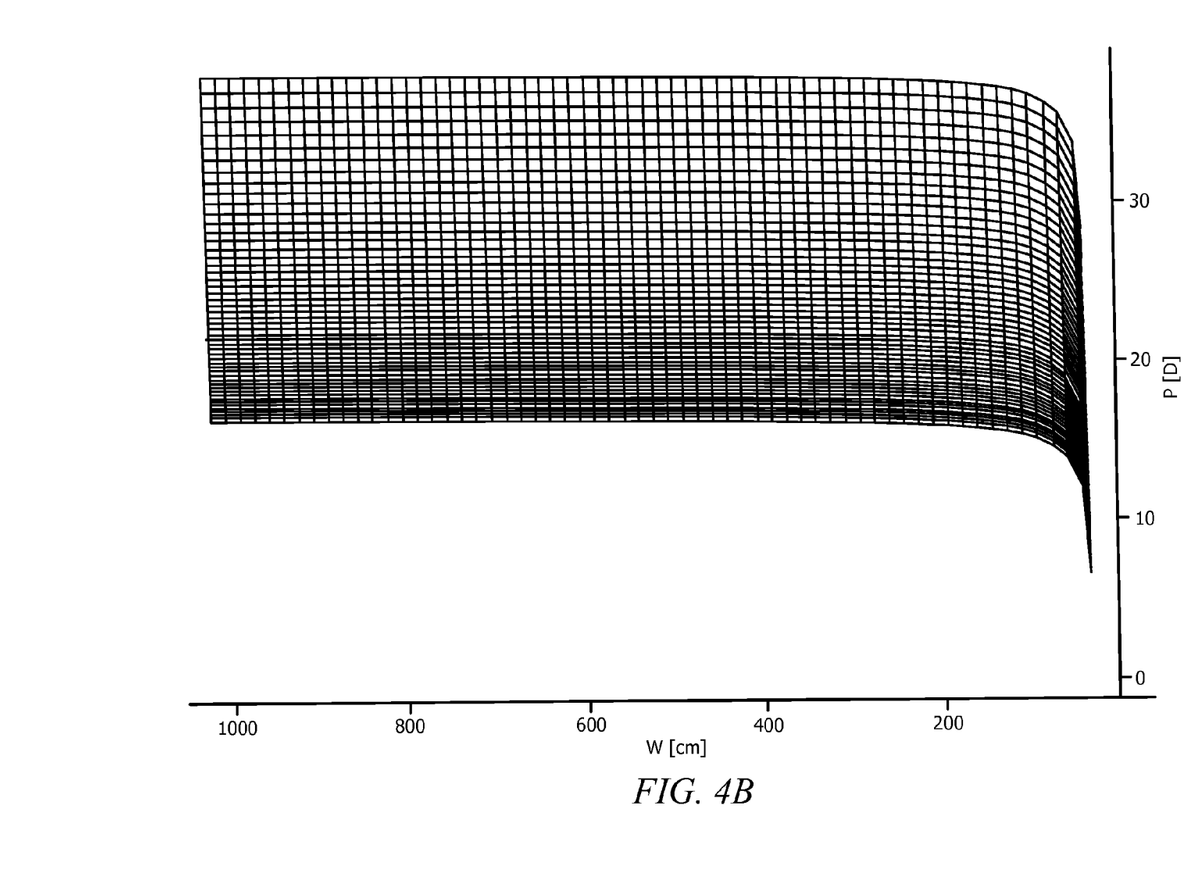
FIG. 4B shows the variation of the lens P depending on the distance (W) of the virtual image from the user.

FIG. 4A is a multidimensional plot showing the variation in lens P in Dipoters, P[D]) of the reflective inside surface 110 with respect to W in cm, and with respect to Sp in consideration from the particular location on the reflective inside surface 110 (e.g., oxel) being analyzed. The amount of lens P can be seen to increase with a decrease in Sp. FIG. 4B shows the variation of the lens P as a function of W. After a certain distance the P setting levels out, but nearer to the user, P decreases rapidly. For example, if the virtual image was intended to appear right in front of the HMD, at the Vertex, region 110a, then approximately no power would be needed (P=0), and the surface could be essentially a simple flat mirror.

W in Equation 5 above can thus be held constant across an area (portion) of a disclosed reflective inside surface of a lens. P changes at the respective oxels based upon the geometry of the system at each oxel, such as based on Equation 5, for an optical see-through AR HMD in order to provide images appearing at a desired virtual image distance (focus distance). For example, FIG. 5 shows an example reflective optical surface 505 of a lens 500 having an upper portion 510 having a lens power distribution to provide a focus at a virtual image distance at a first example distance of 50 m such that virtual images appear with the correct vergence as if they are at 50 m away from the user, and the lower portion 520 having lens power distribution to provide a focus at a virtual image distance at a second example distance of 100 cm (1 m).

Figure 5:
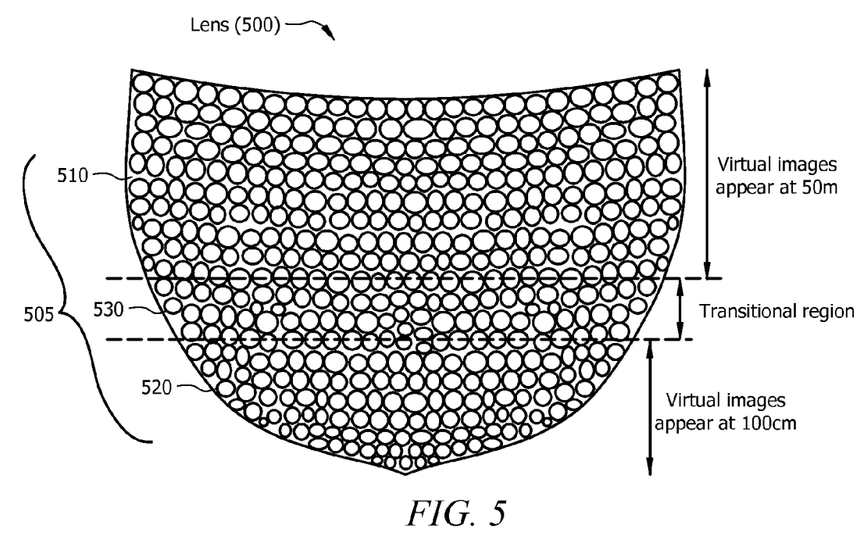
FIG. 5 depicts a disclosed reflective optical surface including an optional transition region that allows distance focus to progress into near-focus, showing three different regions, each providing different virtual image distances.

An optional transition portion 530 is also shown in FIG. 5 having a lens P distribution to provide a focus at a virtual image distance that is between the first virtual image distance and second virtual image distance. The transition in virtual image distance in transition portion 530 between the virtual image distance in upper portion 510 of 50 m and in region 520 of 1 m can be monotonic, such as linear or by another interpolating method. The transition portion 530 may be shrunk to zero, creating a bifocal lens effect. Other patterns of transition can also be provided.

The manner in which the P distribution can be designed is to assign a virtual image distance value for each oxel across the surface of reflective optical surface 505, or for each region, and the system can automatically adapt its calculations and calculate a P value to produce a surface for each of a plurality of small areas of the reflective optical surface 505 that will focus the portrayed virtual mages to appear optically at the virtual image distance. Stereoscopic placing of the virtual object into the virtual scene will still generally be accomplished using 3D computer graphics methods, but the optical focus provided by disclosed reflective optical surfaces will now allow the eye to focus on it at the expected distance.

Different portions (areas) of the reflective surface 110 thus may be designed to have different virtual object focus characteristics, such as the upper portion 510 and lower portion 520 for the reflective optical surface 505 shown in FIG. 5. The upper portion 510 has a lens P distribution to provide a focus at a virtual image distance at a first example distance of 50 m, and lower portion 520 has a lens P distribution to provide a focus at a virtual image distance of 100 cm (=1 m). The virtual object focus characteristics can depend on the user's needs. For example, in a bifocal example, how much a user intends to do close work or distant work can be used to design how much of the reflective inside surface 110 to devote to distant virtual object focus and how much to devote to close-up virtual object focus.

Disclosed embodiments also include lenses having optional corrective lensing, such as for correcting the nearsightedness of a user. In this embodiment the outside of the lens may be curved so as to correct the vision for external-world objects, while the inside portion of the lens may be curved as described above to correct the vision of virtual-reality objects reflected from the reflective optical surface for the user of the HMD.

Figure 6:
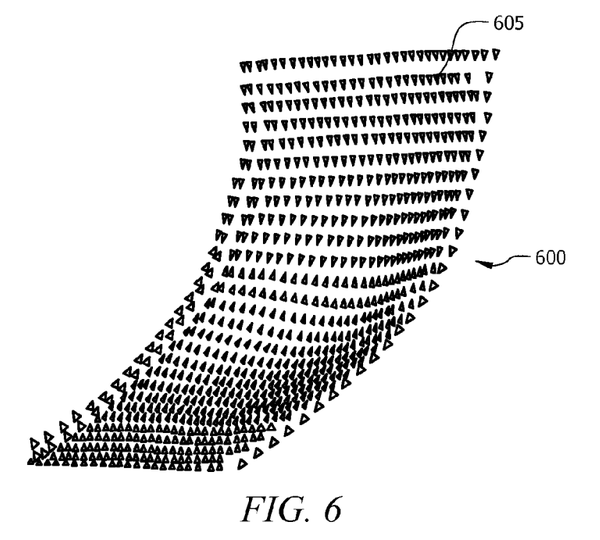
FIG. 6 depicts an example lens having a reflective 3D surface created using the oxel method having a plurality of reflective optical elements that is configured to provide different portions (areas) of the reflective optical surface to have different virtual object focus characteristics.

FIG. 6 depicts an example lens 600 having a reflective 3D inner surface created using the oxel method having a plurality of reflective surface elements 605 configured to provide different portions (areas) of the reflective surface 110 to have different virtual object focus characteristics. As can be seen in FIG. 6, the configuration of disclosed reflective 3D surface of the lens 600 is complex and bears little resemblance to the spherical or aspherical surfaces created by other optical design techniques. Although not shown in FIG. 6, as described above the individual reflective surface elements 605 are generally splined together to create a smooth continuous surface, so a large number (by way of a non-limiting example, thousands) of reflective surface elements 605 may fabricated on a common material with a surface that is smooth at a fine grain level.

Figure 7A:
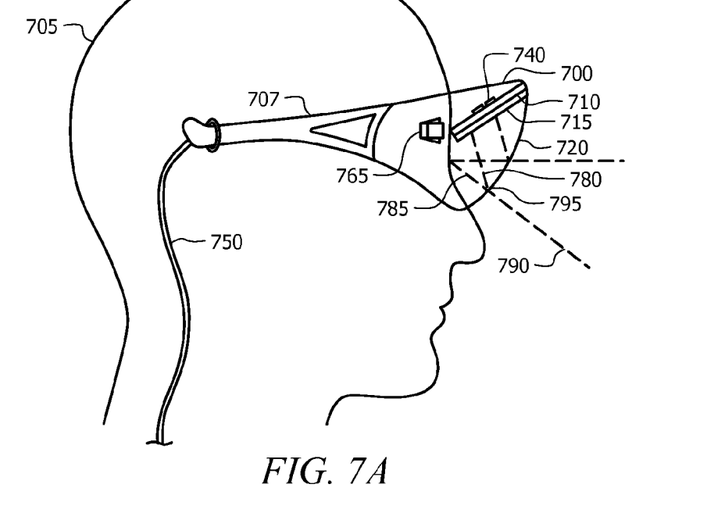
FIG. 7A is a side view representation of an example head-mounted display (HMD) apparatus including a disclosed reflective optical surface having a plurality of regions each providing different virtual image distances, according to an example embodiment.

FIG. 7A is a side view representation of an example HMD apparatus 700 including a disclosed reflective inside surface including a first inside portion which provides a first virtual focus depth (first virtual image distance) and a second inside surface portion which provides at least a second virtual focus depth (second virtual image distance), according to an example embodiment. The HMD can be an optical see-through HMD. In the case of optical see-through HMD, the lens can comprise a meniscus lens which is a thin lens having the same front and rear surface curvature so that the lens does not bend outside (real) world light.

Figure 7B:
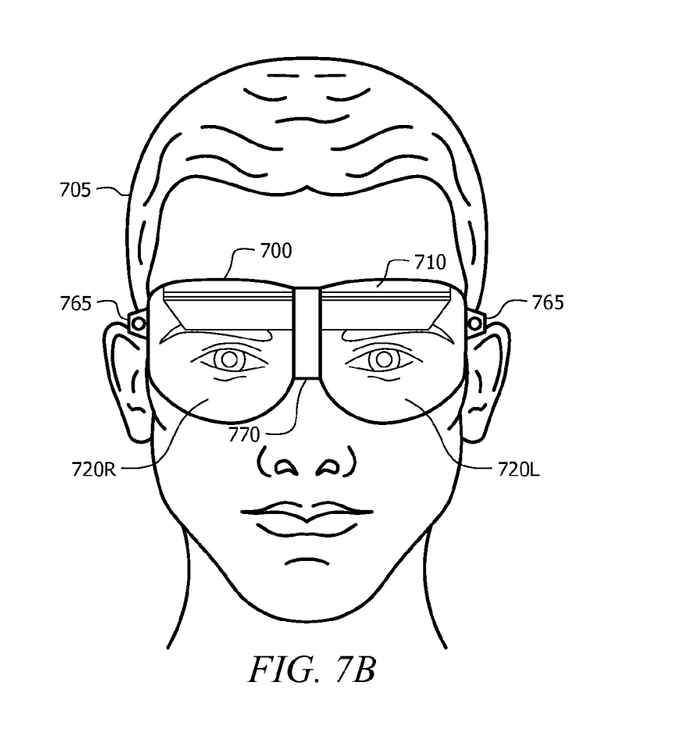
FIG. 7B is a front view representation of the example HMD apparatus of FIG. 7A.

FIG. 7B is a front view representation of the example HMD apparatus 700 of FIG. 7A. As shown in FIGS. 7A and 7B, the HMD 700 includes a frame 707 adapted to be worn on the head 705 of the user and supported by the user's nose and ears in a manner similar to that in which eyeglasses are worn. In the embodiment of FIGS. 7A and 7B, as well as in the other embodiments disclosed herein, the HMD may have a variety of configurations and can, for example, resemble conventional goggles, glasses, helmets, and the like. In some embodiments, a strap may be used to hold the HMD's frame in a fixed position with respect to the eyes of the user. In general terms, the outside surface of the HMD package can assume any form that holds the optical system in the required orientation with respect to the HMD's display(s) and the user's eyes.

The HMD 700 includes at least one image display system 710 and at least one optical system that includes a reflective optical surface which, as shown in FIGS. 7A and 7B is free space, wide angle lens 720 including a disclosed reflective inside surface, which by necessity is curved. In some embodiments, the lens 720 can be the entire optical system. The lens 720 can be purely reflective or can have both reflective and transmissive properties, in which case, it can be thought of as a type of "beam splitter."

The lens 720 is designed for one eye, and may completely surround the eye and the at least one image display system 710. In particular, the lens 720 can curve around the sides of the eye and toward the sides of the face so as to expand the available horizontal FOV. In one embodiment, the lens 720 may extend up to 150° or more (e.g., more than 200). As illustrated in FIG. 7B, the HMD 700 may include two separate lenses 720R and 720L for the user's two eyes which are separately supported by the frame and/or a nasal ridge piece 770 (see below).

As noted immediately above and as illustrated in FIG. 7B, the HMD apparatus 700 can include a nasal ridge piece 770. The nasal ridge piece 770 can be a vertical bar or wall which provides a separation between lens 720L and lens 720R, one for each of the user's eye. The nasal ridge piece 770 can also provide a separation between the fields of view of the user's two eyes. In this way, the user's right eye can be shown a first representation of three dimensional physical reality in the environment by displaying a first image to the right eye via a first image display device and lens 720R, while the user's left eye is shown a second representation of three dimensional physical reality in the environment by displaying a second image to the left eye via a second image display device and lens 720L.

A separate display device/reflective surface combination thus services each eye of the user, with each eye seeing the correct image for its location relative to the three dimensional physical reality in the environment. By separating the user's two eyes, the ridge piece 770 allows the image applied to each eye to be optimized independently of the other eye. In one embodiment, the nasal ridge piece's vertical wall may include two reflectors, one on each side, to allow the user to see imagery as he/she turns his/her eyes nasally, either to the left or to the right. These reflectors may be extensions of the single lens per eye, smoothly varying into a tighter curvature in the nasal direction.

The at least one image display system 710 can be mounted inside the lens 720. Alternatively, the at least one image display system can be located just outside of the lens 720. The tilt or angle of the at least one image display system 710 or, more particularly, its at least one light-emitting surface, will in general be a function of the location of the pixels, images, and/or pieces of display information that are to be reflected from the lens 720.

In certain embodiments, the HMD apparatus 700 is configured to create an interior cavity, with the lens 720 being reflective inward into the cavity. For a lens 720 having transmissive properties, the image or display information from the at least one image display system 710 is reflected into the cavity and to the user's eye from the surface while, simultaneously, light also enters the cavity and the user's eye from the external world by passing through the reflective surface.

In certain embodiments, the at least one image display system 710 provides images and/or pieces of display information that prior to entering the user's eye(s) are adjusted for near viewing. In some embodiments, an optional lens or lens system 715 may contribute to this adjusting. One or more Fresnel lenses can be used for this purpose. Other embodiments do not utilize the optional lens or lens system, and instead rely on the lens 720 to provide desired optical properties for in-focus, near-to-the-eye viewing of the images formed by the display system.

The HMD apparatus 700 can include an electronics package 740 to control the images that are displayed by the at least one image display system 710. In one embodiment, the electronics package 740 includes accelerometers and gyroscopes that provide location, orientation and position information needed to synchronize images from the at least one image display system 710 with user activities. Power and video to and from the head-mounted display apparatus 700 can be provided through a transmission cable 750 coupled to the electronics package 740 or through a wireless medium.

A set of cameras 765 may be situated on opposite sides of the HMD apparatus 700 to provide input to the electronics package to help control the computer generation of, for example, "augmented reality" scenes. The set of cameras 7650 may be coupled to the electronics package 740 to receive power and control signals and to provide video input to the electronics package's software.

The image display system 710 used in the HMD apparatus 700 can take many forms, now known or subsequently developed. For example, the system can employ small high resolution liquid crystal displays (LCDs), light emitting diode (LED) displays, and/or organic light emitting diode (OLED) displays, including flexible OLED screens. In particular, the image display system can employ a high-definition small-form-factor display device with high pixel density, examples of which may be found in the cell phone industry. A fiber-optic bundle can also be used in the image display system. In various embodiments, the image display system can be thought of as functioning as a small screen television. If the image display system produces polarized light (e.g., in the case where the image display system employs a liquid crystal display where all colors are linearly polarized in the same direction), and if the lens 720 is polarized orthogonally to the light emitted by the display, then a reduction of light leakage out of the lens 720 may result. The information displayed and the light source itself, accordingly, may not be visible outside of the HMD 700.

Overall operation of an example embodiment of an optical system, specifically, an optical system for an "augmented reality" HMD, is illustrated by the ray-tracings of FIG. 7A, specifically, light rays 780, 785, and 790. In this embodiment, lens 720 has both reflective and transmissive properties. Using len's 720 transmissive properties, light ray 790 enters from the environment through the surface and proceeds towards the user's eye. From the same region of the lens 720, light ray 780 is reflected by the surface (using the surface's reflective properties) and joins light ray 790 to create combined light ray 785 that enters the user's eye when the user looks in the direction of point 795, i.e., when the user's direction of gaze is in the direction of point 795. While so looking, the user's peripheral vision capabilities allow the user to see light from other points in the environment which pass through lens 720, again using the surface's transmissive properties.

There are a variety of methods to form disclosed multi-focal reflective optical surfaces. As described above, oxels are not physical objects, nor can they be seen or represented in a physical object as they are surface elements that are points that define the local location of the optical surface. The points are interconnected to make a smooth surface through each surface element such as using splines, Non-uniform rational basis spline (NURBS) which is a mathematical model commonly used in computer graphics for generating and representing curves and surfaces, for example. Methods that can be used to create oxel-derived multi-focal reflective surfaces for real-world applications (e.g., for optical see-through AR HMD displays) include 3D printing of a CAD model containing the exact mathematical surface. Other methods include Single Point Diamond Turning (SPDT) machining of materials such as polycarbonate or aluminum, and through plastic mold technology including hot embossing of polycarbonate or injection molding. Laser ablation may also be used.

Disclosed multi-focal reflective lenses are passive devices that avoid having to use optics that involve extra complexity to enable dynamically changing its lens power properties, such as with inflatable optics or a lens that can change its range of focus electronically. Accordingly, disclosed multi-focal reflective lenses provide a different solution being entirely passive, as there are no moving parts or electrical current needed for operation. Markets which can benefit from disclosed lenses other than optical see-through HMD include logistics, bomb-disposal, vehicle repair, medical care, general consumer use, flight training.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application. The terminology used herein is for the purpose of describing particular embodiments only and is not intended to be limiting to this Disclosure.

The invention claimed is:

1. A lens, comprising:
a partially reflective inner surface and an outside surface, said partially reflective inner surface including:
a first portion having an optical surface with a first curvature providing a first lens power (P) which focuses an incident beam of a first image so that objects in said first image appear at a first virtual distance, and
at least a second portion having an optical surface with a second curvature providing a second P which focuses an incident beam of a second image so that objects in said second image appear at a second virtual distance that is further than said first virtual distance,
wherein said lens is a passive lens.

2. The lens of claim 1, wherein a curvature within said first portion provides a P distribution which varies to minimize a variation in said first virtual distance and a curvature within said second portion provides a P distribution which varies to minimize a variation in said second virtual distance.

3. The lens of claim 2, wherein said curvature is varied within said first portion and within said second portion based on an equation for said P as follows:

$$P = \frac{1}{focalLength[m]} = -\frac{2}{R[m]}[D] = -\frac{|W| - |s_P| - |s_R|}{|s_P|(|s_R| - |W|)}$$

wherein said W is said first virtual distance or said second virtual distance, wherein said $S_R$ is a distance from a respective location on said partially reflective inside surface to a predetermined position of an eye of a user of said lens, and wherein said Sp is a distance from a display pixel on a pixel display screen that transmits said incident beams to said respective location.

4. The lens of claim 1, wherein said lens comprises a meniscus lens and said outside surface of said lens is curved to match a curvature across said partially reflective inner surface to minimize an optical effect to light from external-world objects transmitted through said lens.

5. The lens of claim 1, wherein said outside surface of said lens is curved so as to provide a correction for light from external-world objects transmitted through said lens.

6. The lens of claim 1, wherein said partially reflective inner surface further comprising a third portion between said first portion and said second portion providing a transition region having a third curvature providing a third P that focuses an incident beam of a third image to provide said third image to appear at a third virtual distance which provides at least one intermediate virtual distance that is between said first virtual distance and said second virtual distance.

7. The lens of claim 6, wherein said intermediate virtual distance changes monotonically between said first virtual distance and said second virtual distance.

8. The lens of claim 1, wherein said partially reflective inner surface comprises a plurality of three dimensional (3D) surface elements configured to provide said first portion and said second portion.

9. A head mounted display (HMD), comprising:
a frame securing a pixel display screen that generates incident beams of virtual images received from a graphics system, and
a curved beam splitter comprising a lens which includes a partially reflective inner surface and an outside surface; wherein said partially reflective inner surface is optically aligned to reflect said virtual images toward an eye of a user of said HMD, wherein said curved beam splitter also transmits incident light from external-world objects on an outside surface of said lens to said eye of said user, wherein said partially reflective inner surface includes:
a first portion having an optical surface with a first curvature providing a first lens power (P) which focuses an incident beam of a first image so that objects in said first image appear at a first virtual distance, and
at least a second portion having an optical surface with a second curvature providing a second P which focuses an incident beam of a second image so that objects in said second image appear at a second virtual distance that is further than said first virtual distance.

10. The HMD of claim 9, wherein said first portion is above or below said second portion.

11. The HMD of claim 9, wherein a curvature within said first portion provides a P distribution which varies to minimize a variation in said first virtual distance and a curvature within said second portion provides a P distribution which varies to minimize a variation in said second virtual distance.

12. The HMD of claim 11, wherein said curvature is varied within said first portion and within said second portion based on an equation for said P as follows:

$$P = \frac{1}{focalLength[m]} = -\frac{2}{R[m]}[D] = -\frac{|W| - |s_P| - |s_R|}{|s_P|(|s_R| - |W|)}$$

wherein said W is said first virtual distance or said second virtual distance, wherein said $S_R$ is a distance from a respective location on said partially reflective inside surface to a predetermined position of an eye of a user of said lens, and wherein said Sp is a distance from a display pixel on a pixel display screen that transmits said incident beams to said respective location.

13. The HMD of claim 9, wherein said lens comprises a meniscus lens and said outside surface of said lens is curved to match a curvature across said partially reflective inner surface to minimize an optical effect to light from external-world objects transmitted through said lens.

14. The HMD of claim 9, wherein said outside surface of said lens is curved so as to provide a correction for light from external-world objects transmitted through said lens.

15. The HMD of claim 9, wherein said partially reflective inner surface further comprising a third portion between said first portion and said second portion providing a transition region having a third curvature providing a third P that focuses an incident beam of a third image to provide said third image to appear at a third virtual distance which provides at least one intermediate virtual distance that is between said first virtual distance and said second virtual distance.

16. The HMD of claim 15, wherein said intermediate virtual distance changes monotonically between said first virtual distance and said second virtual distance.

17. The HMD of claim 9, wherein said lens comprises said curved beam splitter, said curved beam splitter transmitting incident light from external-world objects to said eye of said user.

18. The HMD of claim 17, wherein said lens comprises a meniscus lens.

19. The HMD of claim 9, wherein said partially reflective inner surface comprises a plurality of three dimensional (3D) surface elements configured to provide said first portion and said second portion.

* * * * *